US011927215B2

(12) United States Patent
Mabire

(10) Patent No.: US 11,927,215 B2
(45) Date of Patent: Mar. 12, 2024

(54) TURBOMACHINE CLEVIS WITH BUILT-IN FILTER AND METHOD OF PRODUCING SAID CLEVIS

(71) Applicant: SAFRAN TRANSMISSION SYSTEMS, Colombes (FR)

(72) Inventor: Simon Pierre Mathieu Mabire, Moissy-Cramayel (FR)

(73) Assignee: SAFRAN TRANSMISSION SYSTEMS, Colombes (FR)

( * ) Notice: Subject to any disclaimer, the term of this patent is extended or adjusted under 35 U.S.C. 154(b) by 386 days.

(21) Appl. No.: 16/482,201

(22) PCT Filed: Jan. 30, 2018

(86) PCT No.: PCT/FR2018/050211
§ 371 (c)(1),
(2) Date: Jul. 30, 2019

(87) PCT Pub. No.: WO2018/142058
PCT Pub. Date: Aug. 9, 2018

(65) Prior Publication Data
US 2020/0124084 A1    Apr. 23, 2020

(30) Foreign Application Priority Data

Feb. 2, 2017   (FR) ...................................... 1750862

(51) Int. Cl.
*F16C 11/04*   (2006.01)
*B22F 5/00*    (2006.01)
(Continued)

(52) U.S. Cl.
CPC .............. *F16C 27/02* (2013.01); *B22F 5/009* (2013.01); *B22F 10/28* (2021.01); *F16C 11/045* (2013.01);
(Continued)

(58) Field of Classification Search
CPC ........... F16C 11/045; Y10T 403/32614; Y10T 403/32861; Y10T 403/32868;
(Continued)

(56) References Cited

U.S. PATENT DOCUMENTS

| 5,303,880 A | * | 4/1994 | Cencula | ................. B64D 27/26 244/54 |
| 5,860,623 A | * | 1/1999 | Dunstan | ................. B64D 27/26 244/54 |

(Continued)

FOREIGN PATENT DOCUMENTS

| CN | 203035753 U | 7/2013 |
| FR | 2894934 A1 | 6/2007 |

(Continued)

OTHER PUBLICATIONS

Written Opinion of the International Searching Authority dated Apr. 10, 2018, issued in corresponding International Application No. PCT/FR2018/050211, filed Jan. 30, 2018, 6 pages.
(Continued)

*Primary Examiner* — Michael P Ferguson
(74) *Attorney, Agent, or Firm* — CHRISTENSEN O'CONNOR JOHNSON KINDNESS PLLC

(57) ABSTRACT

A clevis, particularly for a turbomachine includes a body that is attachable to a casing and at least one aperture for fitting a hinge pin. The body is formed in one piece and includes, about the at least one aperture, a honeycomb-type annular portion. The annular portion acts as a vibration filter and has a compressive and/or flexural strain capacity greater than that of the rest of the body.

2 Claims, 3 Drawing Sheets

(51) Int. Cl.
  *B22F 10/28*  (2021.01)
  *F16C 27/02*  (2006.01)
  *B22F 10/73*  (2021.01)
  *B22F 12/52*  (2021.01)
  *B22F 12/63*  (2021.01)
  *B22F 12/67*  (2021.01)
  *B33Y 10/00*  (2015.01)
  *B33Y 80/00*  (2015.01)
  *B64D 27/26*  (2006.01)

(52) U.S. Cl.
  CPC ............... *B22F 10/73* (2021.01); *B22F 12/52* (2021.01); *B22F 12/63* (2021.01); *B22F 12/67* (2021.01); *B33Y 10/00* (2014.12); *B33Y 80/00* (2014.12); *B64D 2027/266* (2013.01); *Y10T 403/32918* (2015.01)

(58) Field of Classification Search
  CPC ............ Y10T 403/32918; B64D 27/26; B64D 2027/262; B64D 2027/266; B64D 2027/268
  See application file for complete search history.

(56) References Cited

U.S. PATENT DOCUMENTS

| | | | | |
|---|---|---|---|---|
| 8,328,132 | B2* | 12/2012 | Marche | B64D 27/26 244/54 |
| 9,897,162 | B2* | 2/2018 | Witwer | F16F 15/085 |
| 10,351,254 | B2* | 7/2019 | Journade | B64D 27/26 |
| 2003/0063826 | A1 | 4/2003 | Cevasco et al. | |
| 2010/0329597 | A1 | 12/2010 | Schimschal | |
| 2011/0176757 | A1 | 7/2011 | Heldmann et al. | |
| 2014/0077027 | A1 | 3/2014 | Durand et al. | |
| 2014/0130628 | A1 | 5/2014 | Abousleiman et al. | |
| 2016/0245710 | A1* | 8/2016 | Twelves, Jr. | B22F 5/10 |

FOREIGN PATENT DOCUMENTS

| | | |
|---|---|---|
| FR | 2998497 A1 | 5/2014 |
| JP | S5880615 U | 5/1983 |
| WO | 2012131233 A2 | 10/2012 |
| WO | 2013001238 A1 | 1/2013 |
| WO | 2015053940 A1 | 4/2015 |

OTHER PUBLICATIONS

International Preliminary Report on Patentability dated Aug. 6, 2019, issued in corresponding International Application No. PCT/FR2018/050211, filed Jan. 30, 2018, 1 page.

International Search Report dated Apr. 10, 2018, issued in corresponding International Application No. PCT/FR2018/050211, filed Jan. 30, 2018, 7 pages.

Written Opinion of the International Searching Authority dated Apr. 10, 2018, issued in corresponding International Application No. PCT/FR2018/050211, filed Jan. 30, 2018, 7 pages.

\* cited by examiner

TURBOMACHINE CLEVIS WITH BUILT-IN FILTER AND METHOD OF PRODUCING SAID CLEVIS

BACKGROUND

Embodiments of the present disclosure relate to a clevis, in particular a turbomachine clevis, as well as a method of producing such a clevis.

The state of the art comprises utility models published under the numbers CN-U-203 035 753 and JP-U-S58 80615, and patent applications published under the numbers US-A1-2010/329597, WO-A2-2012/131233, US-A1-2011/176757, WO-A1-2015/053940, FR-A1-2 998 497, FR-A1-2 894 934, WO-A1-2013/001238 and US-A1-2003/063826.

A turbomachine, such as a turbine engine, used for propelling aircraft, comprises auxiliary machines necessary for the functioning thereof. These are, for example, fluid pumps to actuate control, lubrication or fuel members, as well as electrical generators. These machines are mounted mechanically with a gearbox which is itself connected to a shaft of the engine through a suitable mechanical connection. This box is commonly designated by the abbreviation thereof, AGB (Accessory Gear Box), in the field. The gearbox is held in suspension on the casing of the engine by suspension devices comprising cranks connected to the clevises of the casing.

FIG. 1 shows a device of this type. The crank 10 comprises an intermediate body of generally elongate shape and connected to the longitudinal ends thereof to connecting heads comprising apertures of which the axes are in substantially parallel planes, the cut plane of FIG. 1 passing through the axis A of one of these apertures 12. This aperture 12 receives a cylindrical cage 14 externally, which is held by crimping in the aperture 12. The inner surface of the cage 14 is used to guide a sleeve to the outer spherical surface forming a ball 16.

Each head 18 of the crank is mounted between the ears 20, 22 of a female clevis 24, only one portion of the crank 10 being visible in FIG. 1. The visible head 18 is held between the two ears 20, 22 by a screw 26 which passes through the latter and the ball 16. The screw 26 is itself immobilised by a nut 28.

The crank 10 axially immobilised along the direction of the screw 26 by the ball 16, which, as can be seen in the figure, bears from each side against a bearing 30 inserted in the aperture of each ear 20, 22. Thanks to this ball mounting, the head 18 can freely pivot about the axis of the screw and about any axis perpendicular to that within the limits of the abutments defined by the environment. The movement is limited in particular according to the interval, arranged on either side, between the crank head 18 and the ears 20, 22 of the clevis 24.

During the lifespan of the AGB, forces, in particular in a direction parallel to the axis of the crank 10, generated by vibrations of the engine, travel through the suspension device towards the AGB and the accessories that it supports. These urges finish by causing degradations to the AGB or the accessories.

A solution to this problem consists of equipping this type of device with means for damping the vibrations. The solution illustrated by FIG. 1 consists of mounting the screw 26 in the apertures of the ears 20, 22 of the clevis by way of damping bearings 30. The aperture of each ear receives a damping bearing 30 comprising inner 34 and outer 36 annular rings, between which extends an elastomer annular damper 38.

However, this technology has disadvantages connected, in particular, to temperature stability and to liquid products (pollutants, solvents, kerosene, etc.) of the damper (degradation of the elastomer and variability of dynamic performance). Indeed, due to the elastomer production thereof, the use of the damper is limited to applications where the ambient temperature is generally less than 200° C. In addition, the elastomer failure mechanisms are insufficiently formalised, which involves an increase in frequency of replacing the bearing to replace since the appearance of the first fissure while it should also be able to ensure the function thereof for numerous cycles.

SUMMARY

Embodiments of the disclosure proposes an improvement of the technology described above, which represents a simple, effective and economic solution, in particular to respond to the abovementioned problem of thermal stability of the damping means.

The disclosure proposes a clevis, in particular for a turbomachine, comprising a body comprising means of attachment to a casing and at least one aperture for fitting a hinge pin, characterised in that the body is formed in one piece and comprises, about the at least one aperture, a honeycomb-type annular portion forming a vibration filter and having a compressive and/or flexural strain capacity greater than that of the rest of the body.

The filter or a portion of the clevis can thus be made of a material resisting increased temperatures, for example greater than 200° C. This is made possible by the honeycomb-type structure having flexibility properties and in particular compressive and/or flexural strain capacities, sufficient to filter a vibration spectrum to which the suspended system is likely to be exposed while functioning.

The clevis according to the disclosure can comprise one or more of the features below, taken separately or in combination with one another:

the clevis is at least partially metal or made of composite material,
the annular portion comprises a mesh-shaped structure,
the body comprises a main honeycomb-type portion, and
the main portion comprises a mesh-shaped structure.

The present disclosure also relates to a suspension device, in particular for a turbomachine, comprising a clevis such as described above, this device further comprising an assembly comprising a ball and a cage which surrounds the ball and is banded or attached in the aperture of the clevis body.

The disclosure also relates to a turbomachine, in particular of an aircraft, comprising such a clevis or such a device, in particular for suspending an AGB to an engine casing.

The disclosure finally relates to a method or producing a clevis, or a clevis portion, such as described above, characterised in that it comprises a step of additive manufacturing the clevis, and in particular of the honeycomb-type annular portion thereof, for example by selective melting of power beds.

DESCRIPTION OF THE DRAWINGS

The disclosure will be best understood and other details, features and advantages of the disclosure will appear more clearly upon reading the following description made as a non-limiting example and in reference to the appended drawings, wherein.

DETAILED DESCRIPTION

Figure 2:
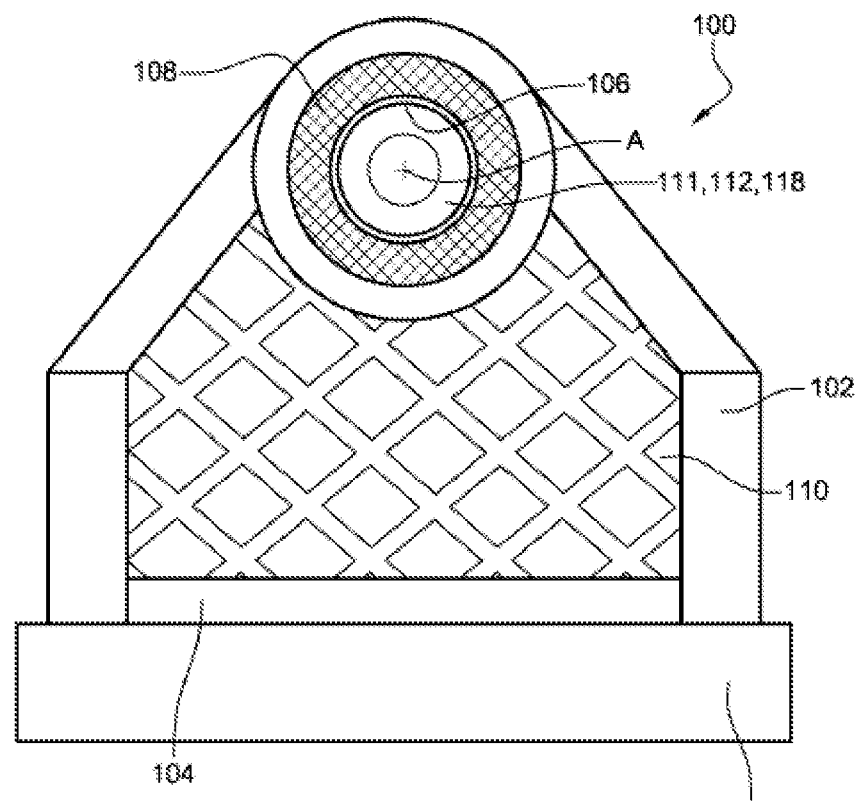
FIG. 2 is a very schematic, partial view of a clevis model, according to the disclosure.

A clevis 100 according to the disclosure, such as illustrated in FIG. 2, comprises a body 102 comprising means 104 for attaching to a turbomachine casing and at least one aperture 106 of axis A. The clevis can be of the male type and comprise one single ear, or of the female type and comprise two ears, substantially parallel, of which the axes of the apertures are aligned.

The body 102 is formed in one piece and comprises, about the aperture 106, a honeycomb-type annular portion 108 forming a vibration filter and having a compressive and/or flexural strain capacity greater than that of the rest of the body.

Figure 4:
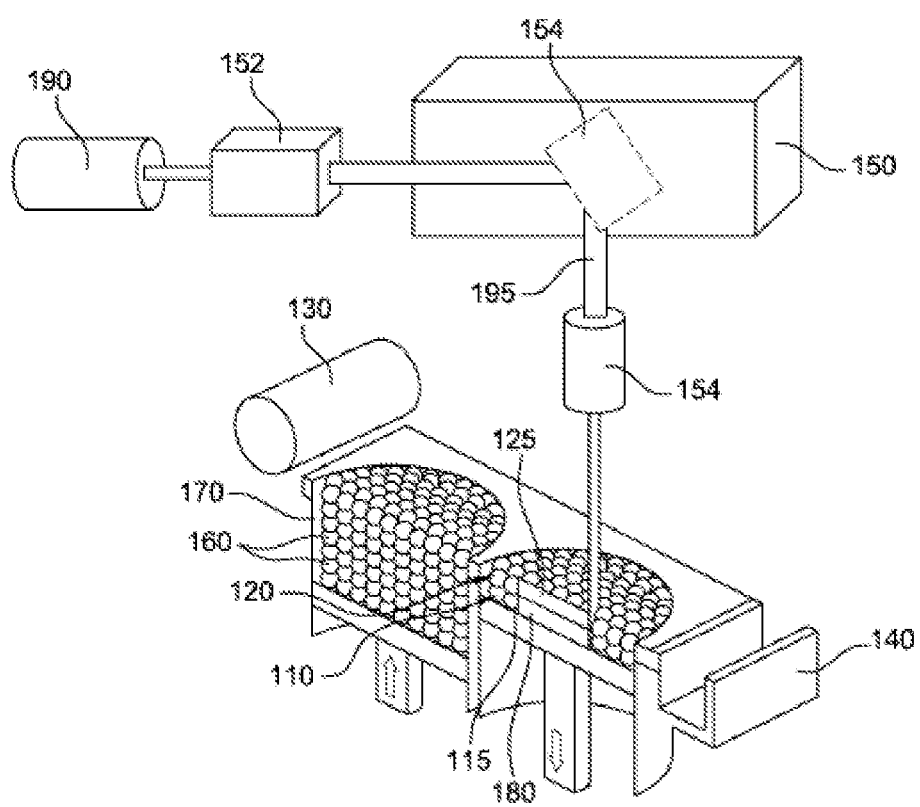
FIG. 4 is, for example, a very schematic view of an installation for the additive manufacturing of a clevis or clevis portion, here according to FIG. 2.

The body 102 and the annular portion 108 are formed in one part, preferably made of metal and by additive manufacturing, as this will be described in more detail in reference to FIG. 4.

The attachment means 104 can comprise a support plate on the casing 105 and comprising bores for screws to pass through, or similar.

The annular portion 108 preferably comprises a mesh-shaped structure, formed by a three-dimensional assembly of patterns (such as intersecting rods) connected to one another. These patterns are separated and spaced from one another by spaces which form air cells from the portion 108.

Advantageously, the body 102 of the clevis comprises a main honeycomb-type portion 110, which can have the same type of structure, namely mesh-shaped. As mentioned above, the portion 108 has a compressive and/or flexural strain capacity greater than that of the portion 110. The honeycomb-type or mesh structure of the portion 110 allows, in particular to reduce it and/or to reinforce the stressed zones.

The main portion 110 is here bordered by a non-honeycomb-type material strip rigidifying the assembly.

Figure 1:
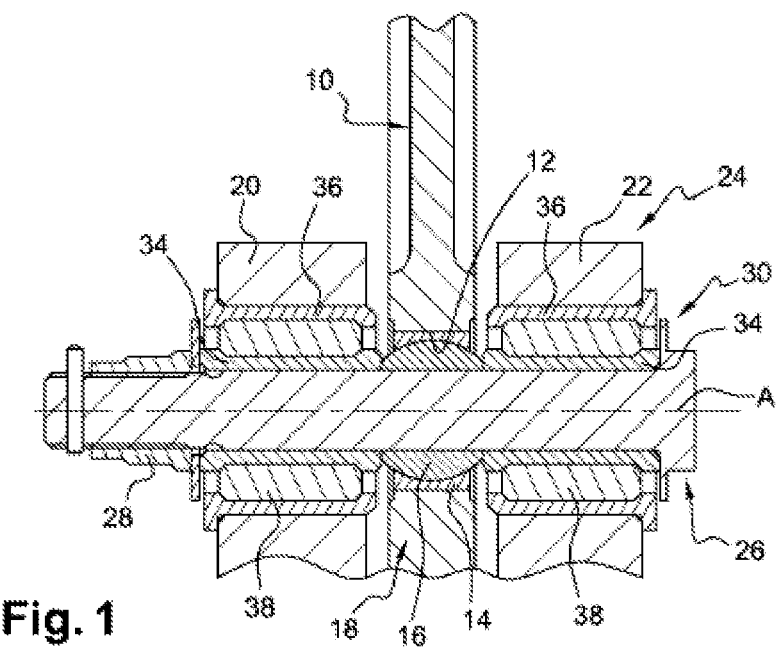
FIG. 1 is a schematic, cross-sectional view of a specific crank model connected to a clevis, according to the prior art.

The clevis 100 can be associated with an assembly comprising a ball 112 and a cage 111 to form a suspension device. The cage 111, which surrounds the ball 112, is banded or attached by another method in the aperture 106 which comprises the annular portion 108. It is thus no longer necessary to provide damping bearings in the apertures 114 of the ears 116 of the clevis. In a variant, the ball 112 and the cage 111 can be replaced by one single cylindrical guiding sleeve 118. The sleeve 118 or the ball 112 and cage 111 assembly is intended to be passed through by a screw 120 similar to that of FIG. 1.

A smooth bearing can be attached and fixed in a clevis aperture.

Figure 3:
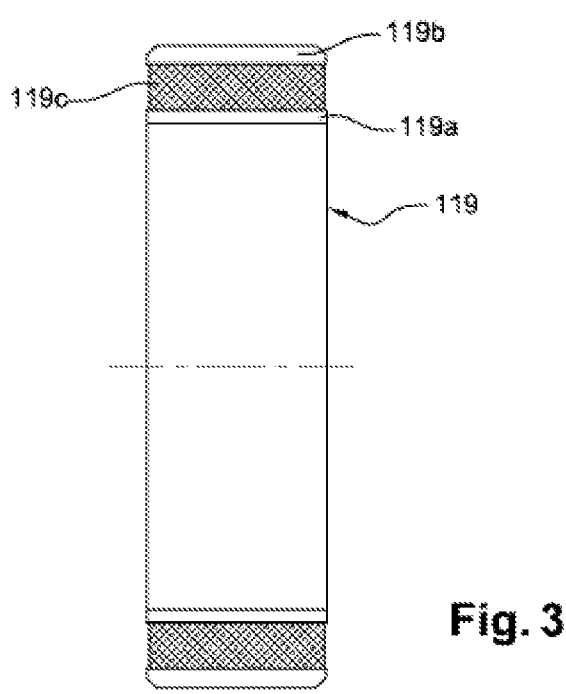
FIG. 3 is a schematic, cross-sectional view of a smooth bearing for a clevis.

FIG. 3 illustrates an embodiment variant of the disclosure in which the portion 108, the cage 111 and the ball 112 (or the portion 108 and the sleeve 118) of the preceding embodiment are replaced by a smooth bearing 119 with a built-in vibration filter. The bearing 119 comprises two annular rings, respectively inner 119a and outer 119b, extending one about the other and connected together by a honeycomb-type or mesh structure 119c forming the vibration filter due to the greater compressive and/or flexural strain capacity thereof than the rings. The bearing is preferably formed in one piece. The rings 119a and 119 are thus connected together in one piece by the structure 119c which can comprise arms organised in repeated and ordered geometric patterns. The assembly is preferably metal. The bearing 119 can also be formed in one piece with the clevis.

The clevis 100 is advantageously produced by additive manufacturing. FIG. 4 shows an example of an installation for producing a clevis by additive manufacturing, and in particular by selective melting of powder beds via a high-energy beam.

The machine comprises a feed tray 170 containing the powder of a material such as a metal alloy, a roller 130 to decant this powder from this tray 170 and spread a first layer 110 of this powder on a construction support 180.

The machine also comprises a recycling tray 140 to recover the powder used (in particular non-melted or non-sintered) and the excess powder (mainly), after spreading the powder layer on the construction support 180. Thus, the main portion of the powder of the recycling tray is composed of new powder. Also, this recycling tray 140 is commonly called an overflow tray or ashtray, by the profession.

This machine also comprises an energy beam generator 190 (for example, laser) 195, and a management system 150 configured to direct this beam 180 over any region of the construction support 180 so as to scan any region of a powder layer. The shaping of the energy beam (laser) and the variation of the diameter thereof over the focal plane are done respectively by means of a beam dilator 152 and a focalisation system 154, the assembly constituting the optical system.

This machine, to apply the method similar to a direct metal deposition (DMD) method on a powder, can use any high-energy beam instead of the laser beam 195, while this beam is sufficiently energetic to, in the first case, melt, or in the other case, form collars or bridges between the powder particles and a portion of the material on which the particles rest.

The roller 130 can be replaced by another suitable deposition system, such as a dispenser (or hopper) associated with a scraper blade, a knife or a brush, configured to decant and spread the layered powder.

The management system 150 comprises, for example, at least one mirror 155 which can be oriented, on which the laser beam 195 is reflected before reaching a powder layer of which each point of the surface is located still at the same height with respect to the focalisation lens, contained in the focalisation system 154, the angular position of this mirror 155 being managed by a galvanometric head such that the laser beam scans at least one region of the first powder layer, and thus follows a pre-established piece profile.

This machine functions as follows. Using the roller 130, a first powder layer 110 of a material is deposited on the construction support 180, this powder being decanted from a feed tray 170 during a movement going from the roller 130 then it is scraped, and possibly slightly compacted, during one (or more) return movement(s) of the roller 130. The excess powder is recovered in the recycling tray 140. A region of this first powder layer 110 is carried, by scanning with the laser beam 195, at a temperature greater than the melting temperature of this powder (liquidus temperature). The galvanometric head is controlled according to the information contained in the database of the computerised tool used for the computer-assisted design and manufacturing of the piece to be manufactured. Thus, the powder particles 160 of this region of the first layer 110 are melted and form a first bead 115 with one single holding, secured with the construction support 180. At this stage, several independent regions of this first layer can also be scanned with the laser beam to form, after melting and solidifying the material, several first beads 115 disconnected from one another. The support 180 is lowered from a height corresponding to the thickness already defined of the first layer (between 20 and 100 µm and generally 30 and 50 µm). The thickness of the powder layer to be melted or to consolidate remains a variable value from one layer to the other, as it is highly dependent on the porosity of the powder bed and of the planarity thereof while the pre-programmed movement of the support 180 is a value invariable to within a tolerance. Then, a second powder layer 120 is deposited on the first layer 110 and on this first bead 115, then a region of the second layer 120 which is located partially or completely above this first bead 115 is heated by exposition to the laser beam 195, such that the powder particles of this region of the second layer 120 are melted, with at least one portion of the first bead 115, and form a second bead from one single holding or consolidated 125, the assembly of these two beads 115 and 125 forming a block from one single holding. To this end, the second bead 125 is advantageously already entirely connected when a portion of this second bead 125 is connected to the first element 115. It is understood that according to the profile of the piece to be constructed, and in particular in the case of undercut surface, it can be that the abovementioned region of the first layer 110 is not located, even partially, below the abovementioned region of the second layer 120, such that in this case, the first bead 115 and the second bead 125 do not thus form a block from one single holding. Then, this process of constructing the piece layer by layer by adding additional powder layers on the assembly already formed is continued. The scanning with the beam 195 allows to construct each layer by giving it a shape according to the geometry of the piece to be produced, for example the abovementioned mesh structures. The lower layers of the piece are cooled more or less quickly, as the upper layers of the piece are constructed.

In order to decrease the contamination of the piece, for example with dissolved oxygen, oxide(s) or another pollutant during the layer by layer manufacturing thereof such as described above, this manufacturing must be carried out in an enclosure with a hygrometry level, controlled and suitable for the method/material pair, filled with a neutral gas (non-reactive) regarding the material considered such a nitrogen (N2), argon (Ar), or helium (He) with the addition or not of a low quantity of hydrogen (H2) known for the reducing power thereof. A mixture of at least two of these gases can also be considered. To prevent the contamination, in particular by oxygen of the surrounding environment, it is used to overpressure this enclosure.

Thus, the selective melting or the selective sintering by laser allows to construct with a good dimensional precision of the slightly contaminated pieces of which the three-dimensional geometry can be complex.

The selective melting or selective sintering by laser furthermore preferably uses powders of spherical morphology, clean (i.e. non-contaminated by residual elements which come from the synthesis), very fine (the dimension of each particle is of between 1 and 100 µm and preferably between 45 and 90 µm), which allows to obtain an excellent surface state of the finished piece.

The selective melting or selective sintering by laser allows moreover for a mass decrease in manufacturing lead times, costs and fixed costs, with respect to a moulded, injected or machined piece.

The invention claimed is:

1. A suspension device for a turbomachine, comprising:
a clevis comprising:
a support plate configured to be attached to a casing of the turbomachine,
an annular ring portion having an aperture extending therethrough,
a peripheral frame coupling the annular ring portion to the support plate, the peripheral frame extending from opposing sides of the annular ring portion and defining an enclosed area between the annular ring portion and the support plate,
a first annular honeycomb-shaped mesh portion disposed within the aperture of the annular ring portion and comprising an aperture therethrough configured to receive a clevis hinge pin assembly, forming a vibration filter and having a compressive and/or flexural strain capacity greater than a rest of the clevis, and
a second main honeycomb-shaped mesh portion disposed within the enclosed area, independent from the first annular honeycomb-shaped mesh portion, extending between an outer periphery of the annular ring portion and an inner periphery of the peripheral frame, the first annular honeycomb-shaped mesh portion having at least one of a compressive strain capacity and a flexural strain capacity greater than the second main honeycomb-shaped mesh portion,
wherein the support plate, the annular ring portion and the first and second honeycomb-shaped mesh portions of the clevis are formed in one piece from metal powder via an additive manufacturing process; and
a clevis hinge pin assembly comprising a ball disposed on a hinge pin and a cage that pivotably surrounds the ball and is bonded or attached in the aperture of the first annular honeycomb-shaped mesh portion.

2. A suspension device for a turbomachine, comprising:
a clevis comprising:
a support plate configured to be attached to a casing of the turbomachine,
an annular ring portion having an aperture extending therethrough,
a peripheral frame coupling the annular ring portion to the support plate, the peripheral frame extending from opposing sides of the annular ring portion and defining an enclosed area between the annular ring portion and the support plate,
a smooth bearing formed in one piece with the clevis and attached in the aperture of the annular ring portion, said smooth bearing comprising inner and outer rings connected by a mesh structure forming a vibration filter and having a compressive and/or flexural strain capacity greater than that of the rings, the inner ring configured to receive a clevis hinge pin assembly;
a second main honeycomb-shaped mesh portion disposed within the enclosed area, independent from the smooth bearing, extending between an outer periphery of the annular ring portion and an inner periphery of the peripheral frame, the mesh structure of the smooth bearing having at least one of a compressive strain capacity and a flexural strain capacity greater than the second main honeycomb-shaped mesh portion,
wherein the support plate, the annular ring portion, the smooth bearing and the second honeycomb-shaped mesh portion of the clevis are formed in one piece from metal powder via an additive manufacturing process.

* * * * *